United States Patent
Koeplinger et al.

(10) Patent No.: US 12,164,463 B2
(45) Date of Patent: Dec. 10, 2024

(54) BUFFER SPLITTING

(71) Applicant: SambaNova Systems, Inc., Palo Alto, CA (US)

(72) Inventors: David Alan Koeplinger, Egg Harbor, NJ (US); Weihang Fan, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 57 days.

(21) Appl. No.: 18/130,667

(22) Filed: Apr. 4, 2023

(65) Prior Publication Data
US 2023/0325346 A1 Oct. 12, 2023

Related U.S. Application Data

(60) Provisional application No. 63/328,684, filed on Apr. 7, 2022.

(51) Int. Cl.
G06F 15/80 (2006.01)
G06F 15/82 (2006.01)

(52) U.S. Cl.
CPC ............ G06F 15/80 (2013.01); G06F 15/825 (2013.01)

(58) Field of Classification Search
None
See application file for complete search history.

(56) References Cited

U.S. PATENT DOCUMENTS

| | | | | |
|---|---|---|---|---|
| 10,839,121 | B1* | 11/2020 | Joshi | G06F 30/3323 |
| 10,853,541 | B1* | 12/2020 | Joshi | G06F 30/327 |
| 2015/0100733 | A1* | 4/2015 | Basto | G06F 12/0846 |
| | | | | 711/123 |
| 2023/0140640 | A1* | 5/2023 | Gurtovoy | G09G 5/397 |
| | | | | 345/522 |

* cited by examiner

*Primary Examiner* — Michael Sun
(74) *Attorney, Agent, or Firm* — Flagship Patents; Sikander M. Khan

(57) ABSTRACT

A method in a reconfigurable computing system includes receiving a user program for execution on a reconfigurable dataflow computing system, comprising a grid of compute units and grid of memory units interconnected with a switching array. The user program includes multiple tensor-based algebraic expressions that are converted to an intermediate representation comprising one or more logical operations executable via dataflow through compute units. These one or more logical operations are preceded by or followed by a buffer, each buffer corresponding to one or more memory units. The method includes determining whether splitting a selected buffer yields a reduced cost and then splitting the selected buffer, in response to the determining step, to produce first and second buffers. Dataflow through memory units corresponding to the first and second buffers is controlled by one or more memory units within the grid of memory units. Buffer splitting optimization reduces memory unit consumption.

19 Claims, 15 Drawing Sheets

730 — Template Dataflow Statements | Tensor Size
```
%1 = tlir.Region(name: "In0"):          NxCxMxK bf16
%2 = tlir.Region(name: "Weight"):       KxN bf16
%3 = tlir.Region(name: "Bias"):         1xN bf16
%4 = tlir.Region(name: "Out0"):         NxCxMxN bf16
%5 = tlir.Load(%2)
%6 = tlir.Load(%3)          ~732
%7 = tlir.MetaPipeline(iters: N) {
    %8 = tlir.Load(%1, dim: 1):         CxMxK bf16
    %9 = tlir.Buffer(%5, depth: 2): ~732 CxMxK bf16
    %10 = tlir.MetaPipeline(iters: C) {
        %11 = tlir.ReadSlice(%9, dim: 1):  MxK bf16
        %12 = tlir.Linear(%5, %11):        MxN bf16
        %13 = tlir.Buffer(%12, depth: 2):  MxN bf16
        %14 = tlir.AddBias(%13, %6):       MxN bf16
        %15 = air.ReLU(%14):               MxN bf16
        %16 = air.Exp(%15):                MxN bf16
        %17 = tlir.Buffer(%16, depth: 2):  MxN bf16
        %18 = tlir.Sum(%17, dim: 1):       Mx1 bf16
        %19 = tlir.Div(%17, %18):          MxN bf16
        %20 = tlir.Store(%4, %19)
    }
}
```

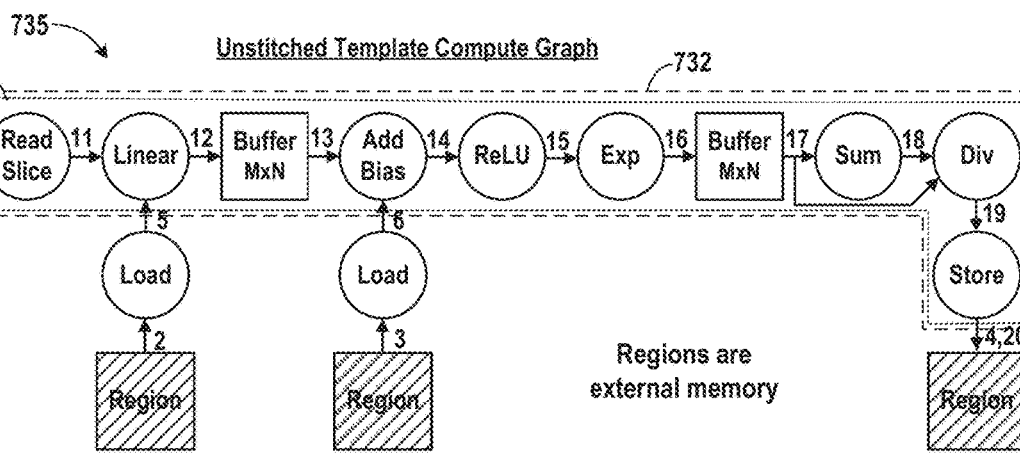

```
function split_buffers:
    for each buffer in graph:                                          1030
        par_factor = max of parallelization of consumer of buffer
        best_cost = cost(buffer, buffer.depth, par_factor)
        best_depth = 0
        for depth in [1, buffer.depth]:
            split_depth = max(buffer.depth - depth, 2)
            expected_cost = cost(buffer, split_depth, 1) + cost(buffer,
            depth, par_factor)
            if expected_cost < best_cost:
                best_depth = 0
                best_cost = expected_cost
        if best_depth > 0
            buffer.depth = max(buffer.depth - best_depth, 2)
            buffer2 = new buffer of depth best_depth
            change all consumers of buffer.output to use buffer2.output
            set buffer2 input to be buffer.output
```

1020

```
function cost(buffer, depth, par_factor):
    resources = 0
    for channel in 0 until par_factor:
        bytes = physical_bytes(buffer, channel shape) * depth
        cost = ceiling(bytes / BytesPerResource)
        resources += (cost > 1) ? cost + 1 : cost
    return resources
```
1040

FIG. 10

BUFFER SPLITTING

RELATED APPLICATIONS AND DOCUMENTS

This application claims the benefit of (priority to) U.S. Provisional Application 63/328,684 filed on Apr. 7, 2022, entitled "Buffer Splitting,".

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

Zhang et al., "SARA: Scaling a Reconfigurable Dataflow Accelerator," 2021 ACM/IEEE 48th Annual International Symposium on Computer Architecture (ISCA), 2021, pp. 1041-1054;

U.S. Nonprovisional patent application Ser. No. 16/260, 548, filed Jan. 29, 2019, entitled "MATRIX NORMAL/ TRANSPOSE READ AND A RECONFIGURABLE DATA PROCESSOR INCLUDING SAME,";

U.S. Nonprovisional patent application Ser. No. 15/930, 381, filed May 12, 2020, entitled "COMPUTATIONALLY EFFICIENT GENERAL MATRIX-MATRIX MULTIPLICATION (GEMM),";

U.S. Nonprovisional patent application Ser. No. 16/890, 841, filed Jun. 2, 2020, entitled "ANTI-CONGESTION FLOW CONTROL FOR RECONFIGURABLE PROCESSORS,";

U.S. Nonprovisional patent application Ser. No. 17/023, 015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031, 679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/216, 647, filed Mar. 29, 2021, entitled "TENSOR PARTITIONING AND PARTITION ACCESS ORDER,";

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. Nonprovisional patent application Ser. No. 17/397, 241, filed Aug. 9, 2021, entitled "FLOATING POINT MULTIPLY-ADD, ACCUMULATE UNIT WITH CARRY-SAVE ACCUMULATOR,";

U.S. Nonprovisional patent application Ser. No. 17/520, 290, filed Nov. 5, 2021, entitled "SPARSE MATRIX MULTIPLIER IN HARDWARE AND A RECONFIGURABLE DATA PROCESSOR INCLUDING SAME,";

All of the related application(s) and documents listed above are hereby incorporated by reference herein for all purposes.

BACKGROUND

The present subject matter relates to optimizing computing tasks for course-grained reconfigurable (CGR) processors.

Reconfigurable processors can be configured to implement a variety of functions more efficiently or faster than might be achieved using a general-purpose processor executing a computer program. For example, coarse-grain reconfigurable architectures (e.g. CGRAs) are being developed in which the configurable units in the array are more complex than used in typical, more fine-grained FPGAs, and may enable faster or more efficient (e.g., dataflow) execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the promise of CGRAs, optimizing the compute graphs for the configurable units of a CRGA remains a challenge.

SUMMARY OF THE INVENTION

A method in a reconfigurable computing system includes receiving a user program for execution on a reconfigurable dataflow computing system, that includes a grid of compute units and a grid of memory units connected with a switching array. The user program includes multiple tensor-based algebraic expressions that are converted to an intermediate representation comprising one or more logical operations executable via dataflow through compute units. These one or more logical operations are preceded by, and/or followed by, a buffer, each buffer corresponding to one or more memory units.

The method also includes determining whether splitting a selected buffer yields a reduced cost and splitting the selected buffer, in response to the determining step, to produce first and second buffers. Dataflow through memory units corresponding to the first and second buffers is controlled by one or more memory units within the grid of memory units. The buffer splitting optimization reduces memory unit consumption and optimizes resource utilization. A buffer resource model may be used to determine if splitting the selected buffer yields a reduced cost, which may be a reduction in needed resources. A corresponding system and computer program product are also disclosed herein.

BRIEF DESCRIPTION OF THE DRAWINGS

FIGS. 7A-7E illustrate various representations of an example user program corresponding to various stages of a compiler stack such as the compiler stack of FIG. 6.

FIG. 10 is a set of code statements of one example of a buffer resource model.

DETAILED DESCRIPTION

Figure 1:
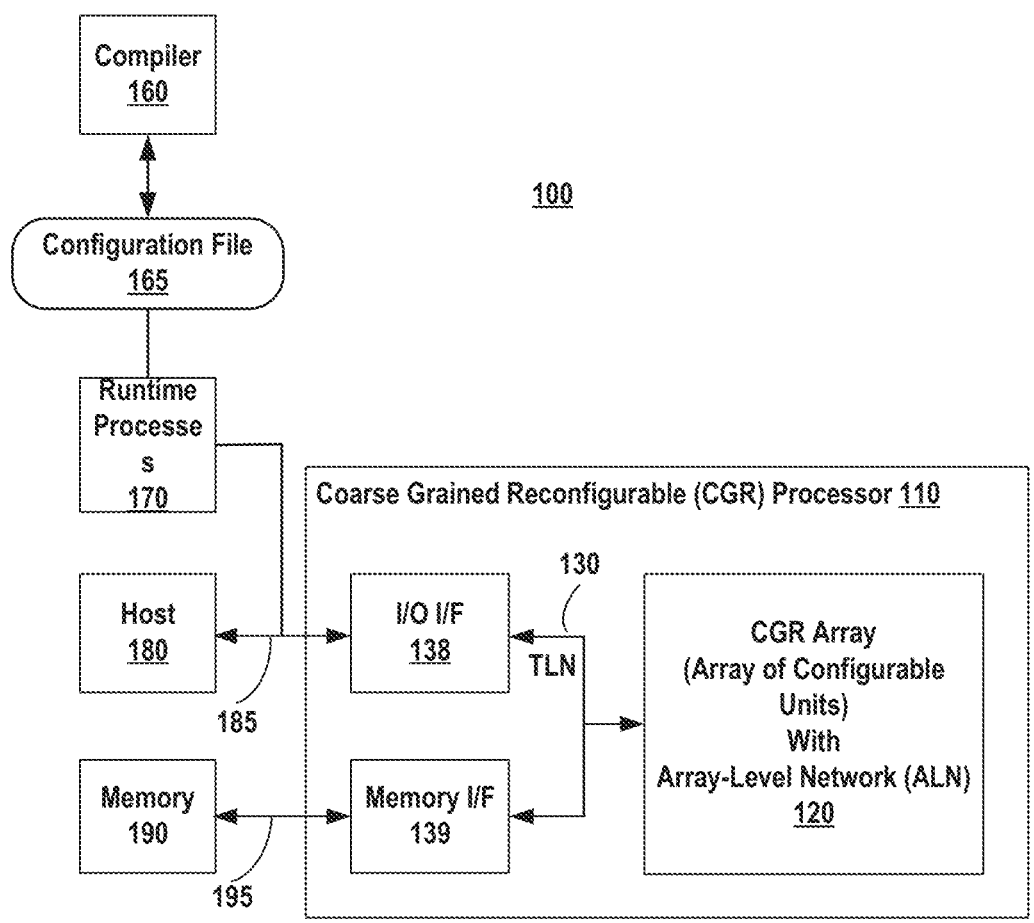
FIG. 1 illustrates an example system including a coarse-grained reconfigurable (CGR) processor, a host, and a memory.

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-7E depict at least one example of an environment wherein the disclosed technology may be deployed while FIGS. 8-14 depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Individual stages may create or update an intermediate representation (IR) of the translated statements. Compiler stages are illustrated with reference to FIG. 6.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

Meta-pipeline—see pipeline.

ML—machine learning.

PCU—pattern compute unit—a compute unit that can be configured to repetitively perform a sequence of operations.

PEF—processor—executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow processor (RDP) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120 (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
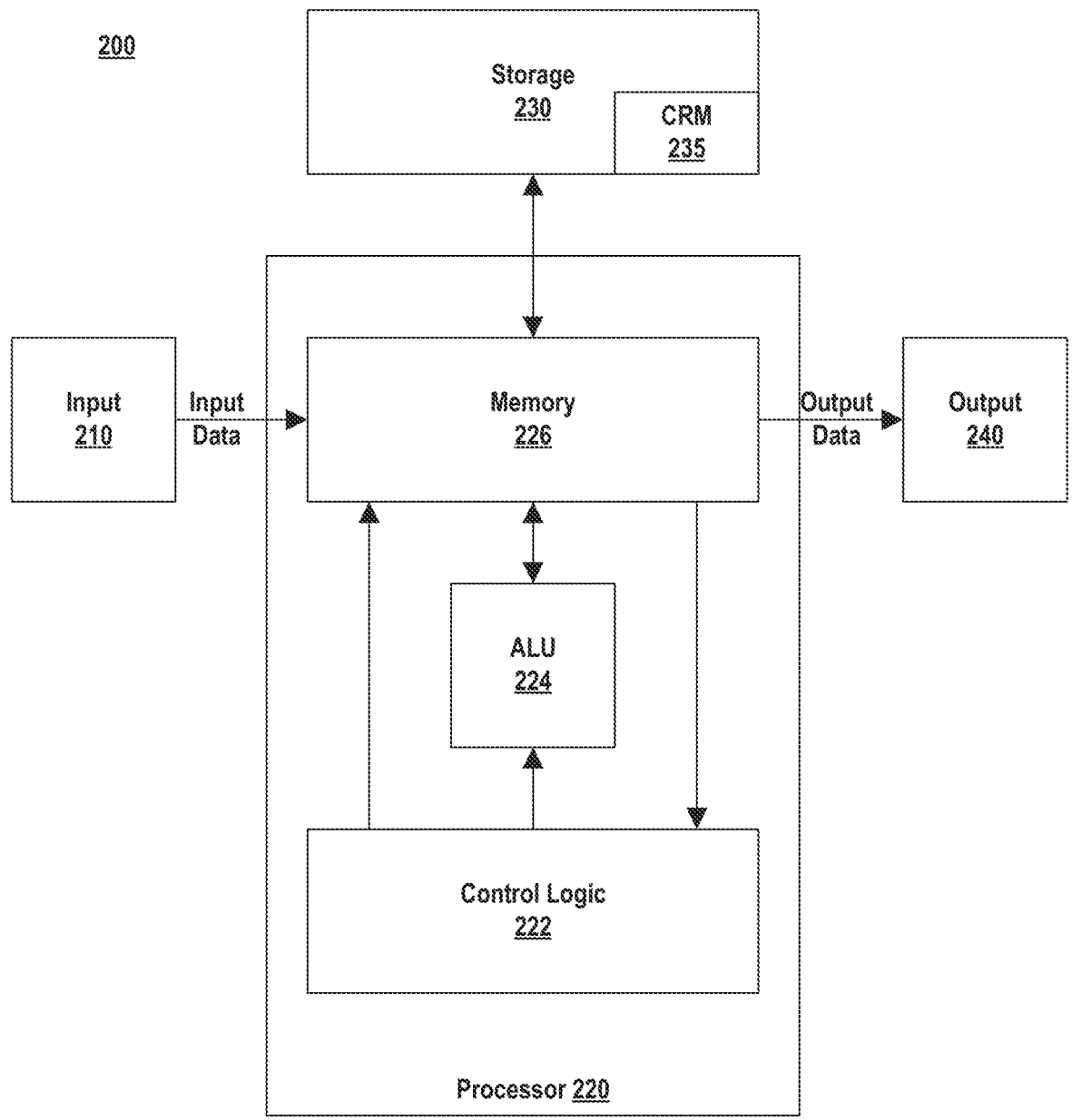
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
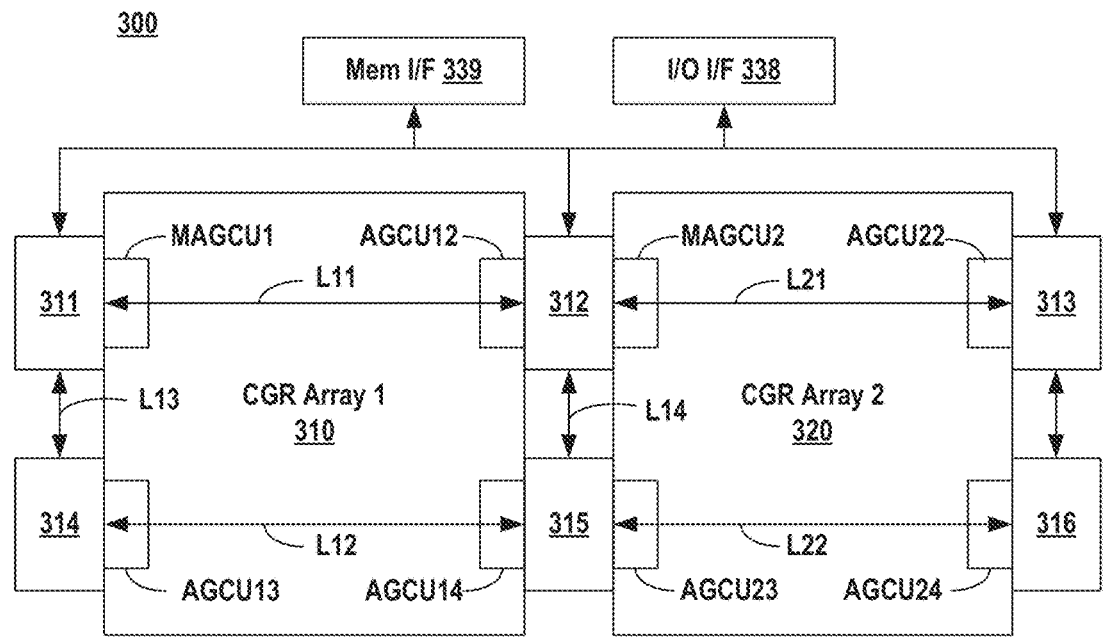
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
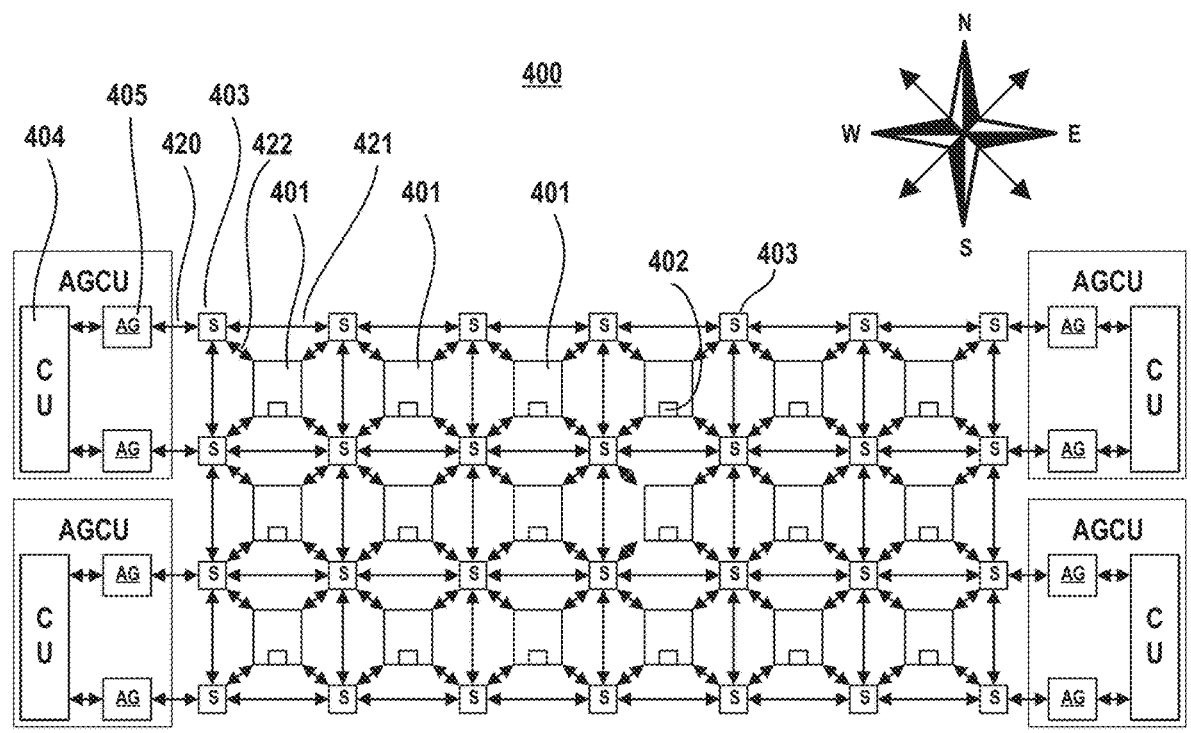
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed by individual stages, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of individual CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of individual packets and other information such as sequence numbers that can be used to reassemble a file when the packets are received out of order. Individual packet headers can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Individual ports may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Individual interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
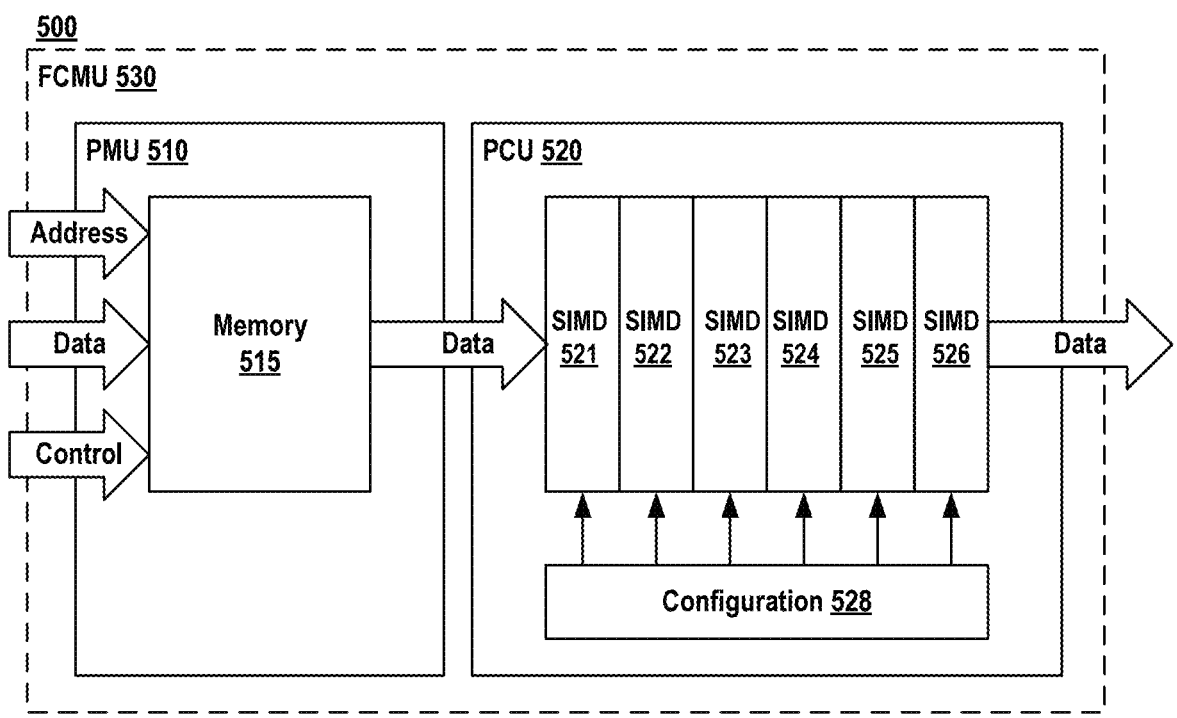
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Individual stages in PCU 520 may also hold one or more registers (not drawn) for short-term storage of parameters. Short-term storage, for example during one to several clock cycles or unit delays, allows for synchronization of data in the PCU pipeline.

Figure 6:
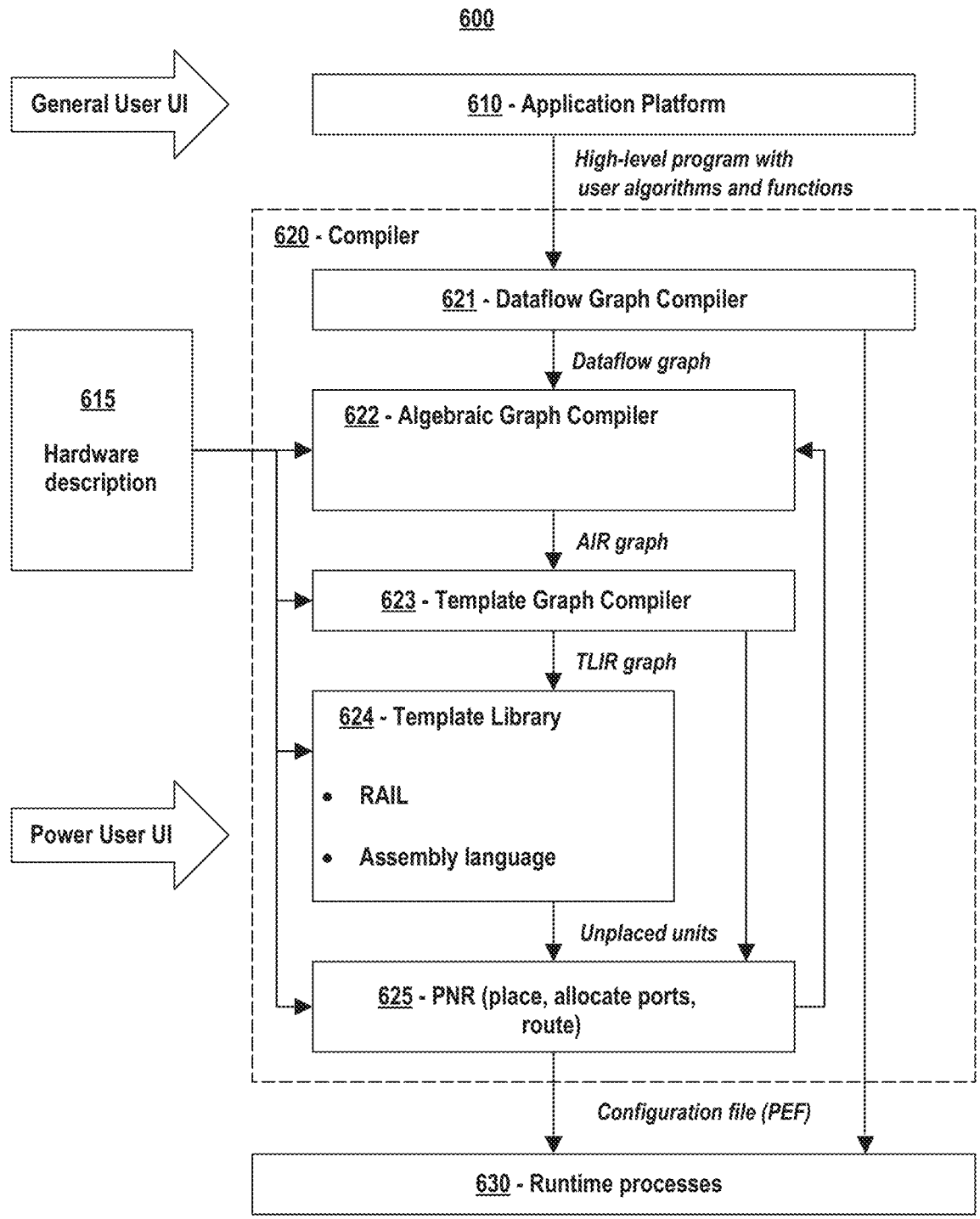
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDP abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HILO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Figure 7A:
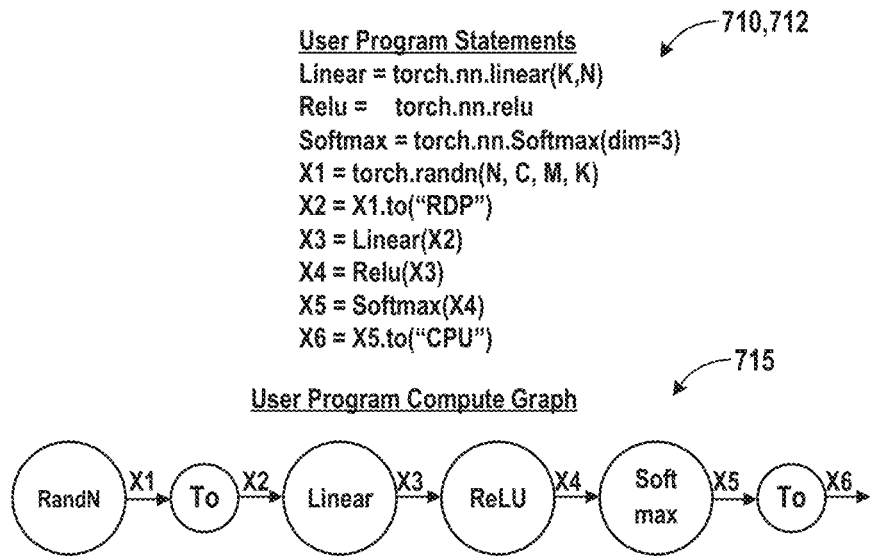
Figure 7B:
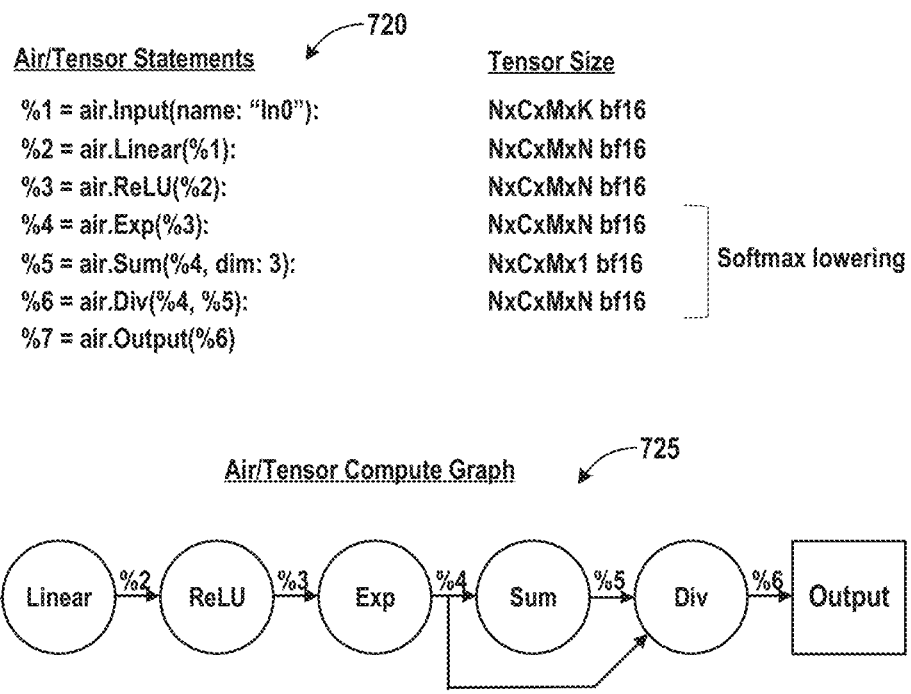

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
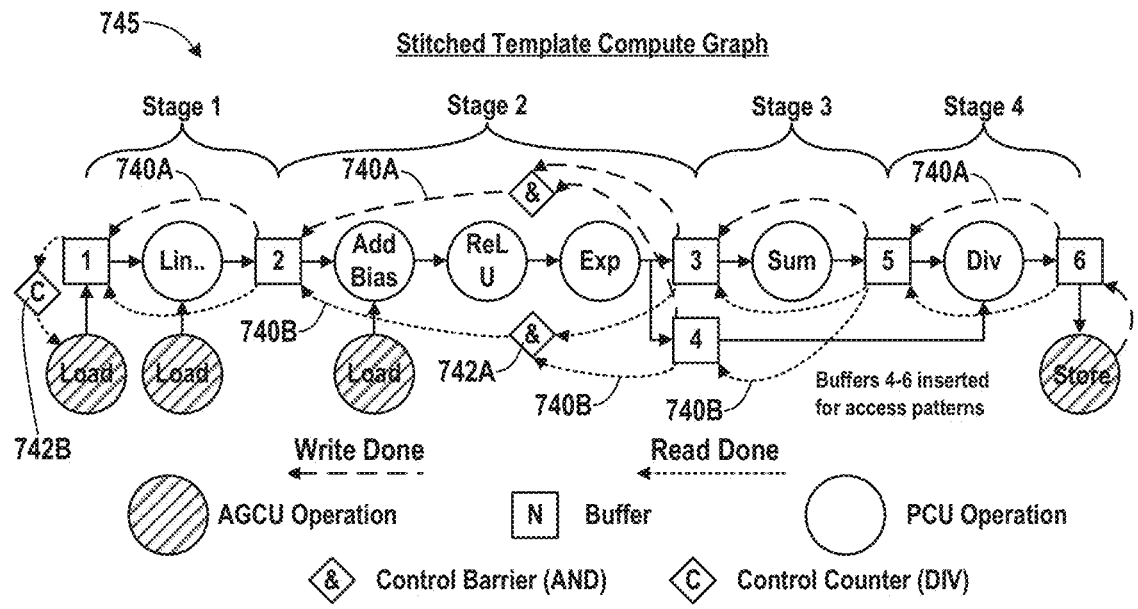
Figure 7E:
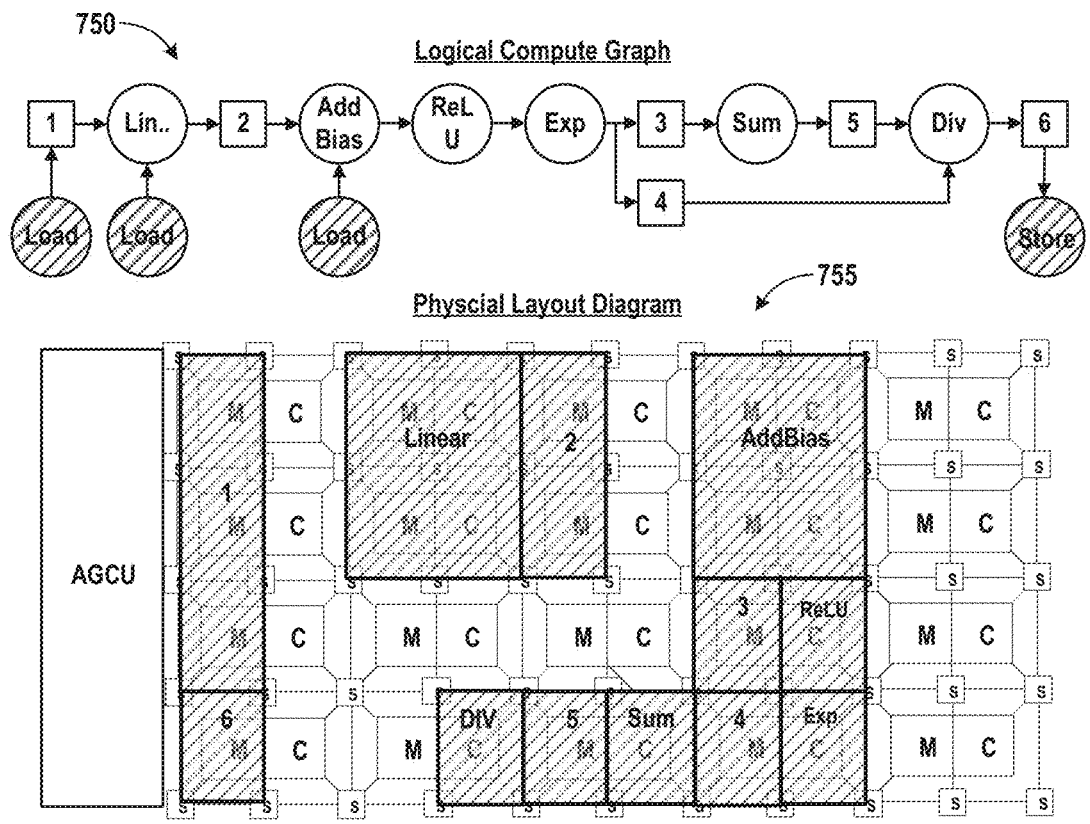

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
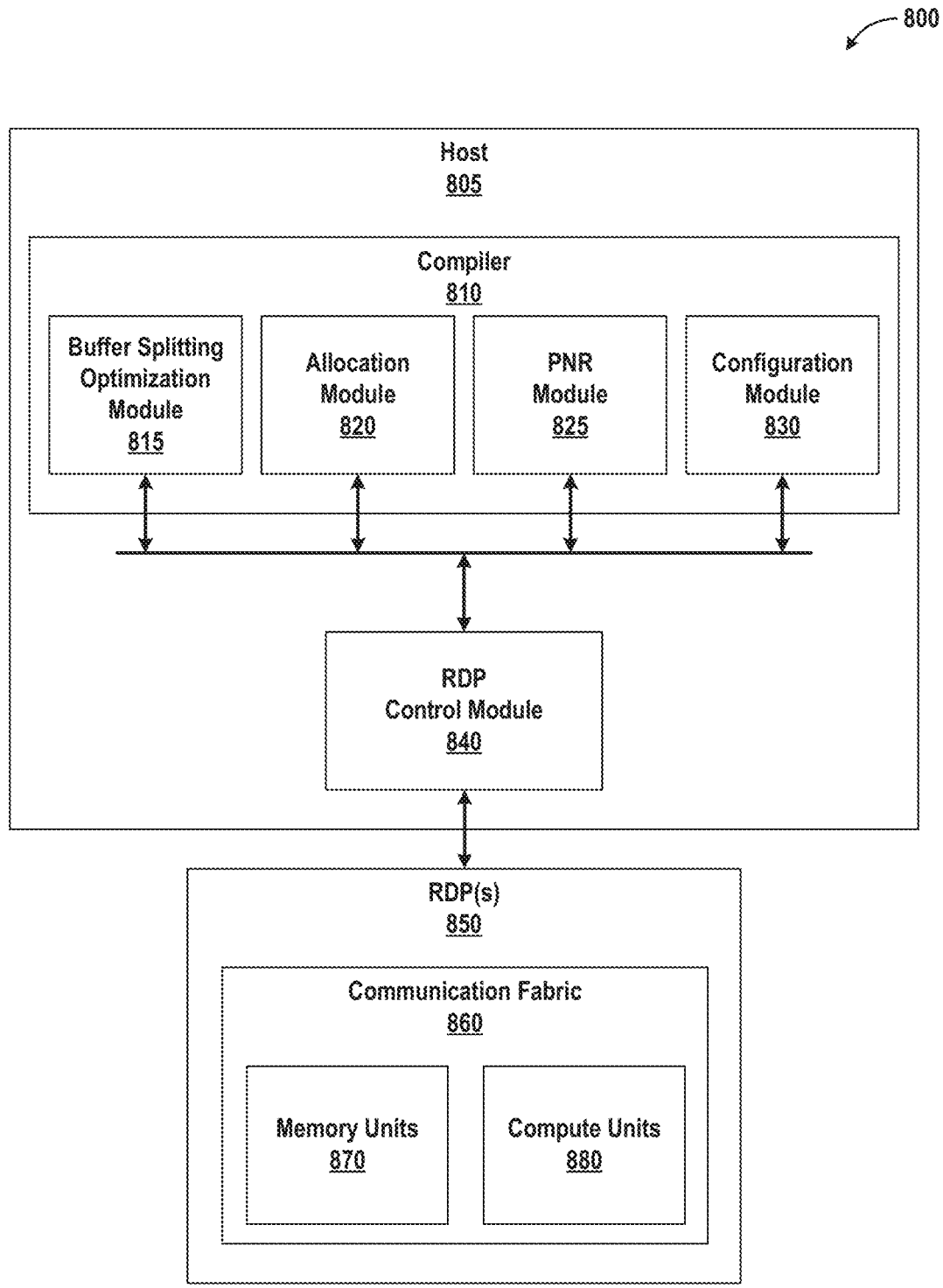
FIG. 8 is a block diagram illustrating one example of a CGR dataflow computing system.

FIG. 8 is a block diagram illustrating one example of a CGR dataflow computing system. As depicted, the template configuration selection system 800 includes buffer splitting optimization module 815, an allocation module 820, a place and route module 825, a configuration module 830, an RDP control module 840, and one or more RDPs 850 comprising a communication fabric 860, memory units 870 and compute units 880. The template configuration selection system 800 enables evaluation and selection of template configurations as well as placement, routing, configuration and deployment of those configured templates on the configurable units of the reconfigurable dataflow processors (RDPs) 850.

The depicted modules 815-840 may reside within, or be available to (e.g., within a library), a compiler 810 that executes on a host 805 and compiles computing tasks for execution on the RDPs 850. The computing task may be represented with a compute graph and/or code statements that indicate the mathematical operations that are to be executed. The buffer splitting optimization module 815 may analyze intermediate representations of a computing task and may split a selected buffer into a first buffer and second buffer to reduce memory unit consumption, reduce latency, increase throughput, and/or optimize resource utilization while maintaining the intended results of the computing task. The allocation module 820 may allocate virtual compute units and memory units to the computing task or a portion thereof. The allocation module 820 may function in conjunction with a partitioner (not shown) that partitions the compute graph into executable sub-graphs and inserts virtual memory units (i.e., buffers) into the compute graph that enable dataflow execution of the sub-graphs on reconfigurable dataflow processors such as the RDPs 850.

The place and route module 825 may generate multiple placement graph options corresponding to the computing task and select the placement graph that best meets the objectives and resources of the RDPs 850. For example, in some situations throughput may be the primary objective while in other situations, minimizing consumed resources may be the primary objective. The placement graphs may specify physical compute units, memory units and switch units that correspond to the virtual units of the executable sub-graph. To reduce communication distance and latency, the specified physical compute units, memory units and switch units may be neighbors in a computing grid on an RDP 850.

The configuration module 830 may generate configuration information for the configuration units specified in the selected placement graphs. The RDP control module 840 may communicate the configuration information to the RDPs 850 and initiate dataflow in the computing grid. The communication fabric 860 may comprise switch units (not shown) that enable communication between the RDP control module 840 and memory units 870 and compute units 880 within the RDP(s) 850. One of skill in the art will appreciate that the placement graphs specified for execution may be relocated at runtime to a currently available RDP and/or a currently available region with a computing grid (e.g., tile) of an RDP. The relocation may preserve the relative positions and connectivity of the configurable units specified by the placement graphs and enable concurrent execution of multiple placement graphs.

Figure 9:
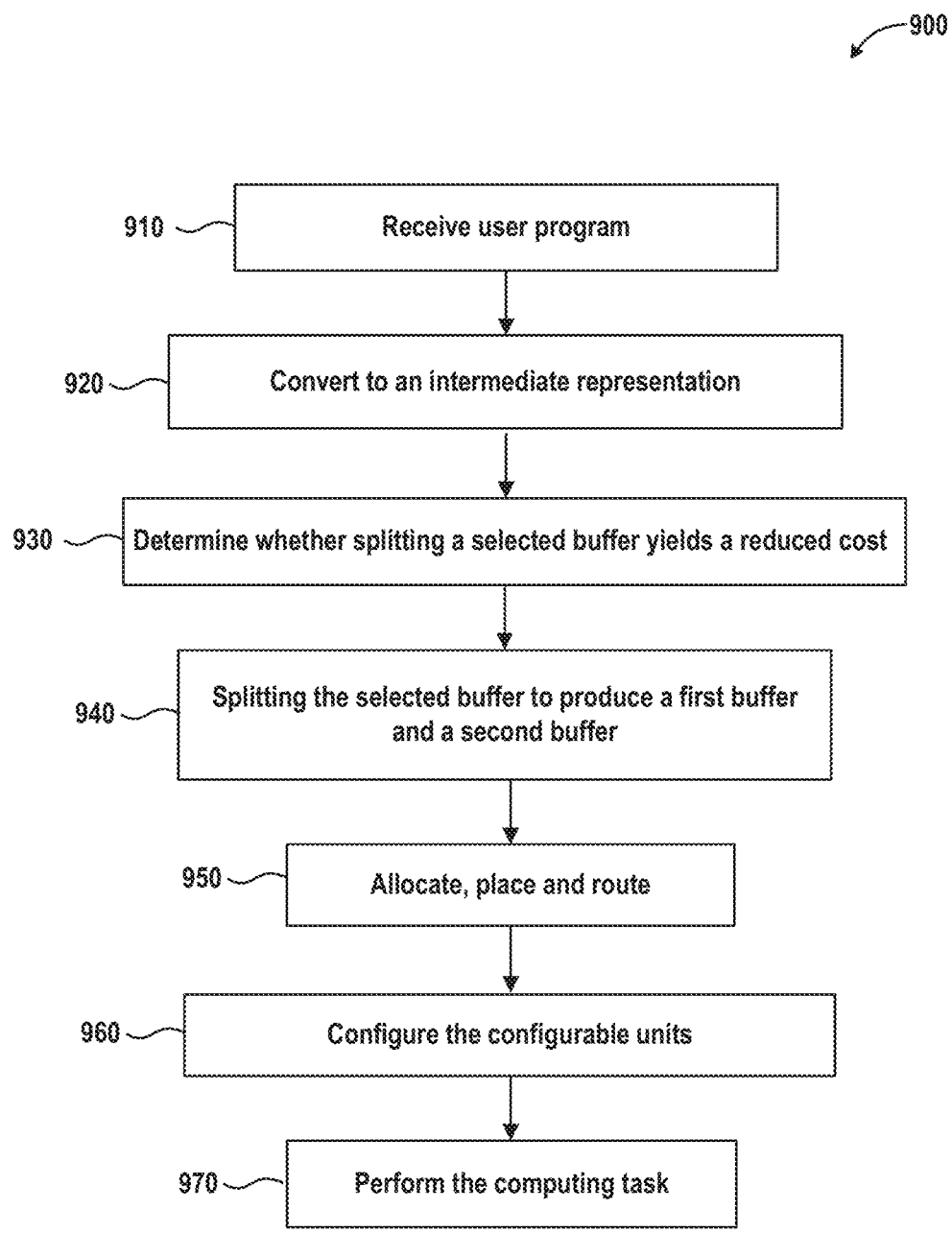
FIG. 9 is a flowchart of one example of a buffer splitting optimization method for a CGR dataflow computing system.

FIG. 9 is a flowchart of one example of a buffer splitting optimization method 900 for a CGR dataflow computing system. As depicted, the critical optimization method 900 includes receiving (910) a user program, converting (920) to an intermediate representation, determining (930) whether splitting a selected buffer yields a reduced cost, splitting (940) the selected buffer to produce a first buffer and second buffer, allocating, placing, and routing (950) configurable units, configuring (960) the configurable units, and performing (970) the computing task. The buffer splitting optimization method 900 enables parallel reads and writes with reduced expense, memory consumption, and latency, as well as improved run-time performance in a CGR dataflow computing system, while also producing an overall reduction in chip real-estate and improved performance. The buffer splitting optimization method 900 may enable further optimizations, such as additional passes of buffer splitting that may be run iteratively until no buffers remain which are advantageous to split or other optimizations. The buffer splitting optimization method 900 may also facilitate improved Placement and consequent Routing by alleviating or deflecting congestion from data path sharing.

Receiving (910) a user program may include receiving a user program for execution on a reconfigurable dataflow computing system. The reconfigurable dataflow computing system may comprise a grid of compute units and a grid of memory units interconnected with a switching array. The user program may include multiple tensor-based algebraic expressions.

Converting (920) to an intermediate representation may include converting the tensor-based algebraic expressions to an intermediate representation comprising one or more logical operations. Each of the one or more logical operations are executable via dataflow through one or more compute units of the grid of compute units. Each logical operation may be preceded by and/or followed by a buffer, and dataflow through the memory units corresponding to each buffer may be controlled by selected memory units (within the grid of memory units). For example, in a template implementation wherein a selected buffer requires more than one physical memory resource, a memory unit corresponding to a reorder buffer may control data writes from memory units corresponding to the selected buffer and/or to control data reads from those memory units.

Determining (930) whether splitting a selected buffer yields a reduced cost may include analyzing a compute graph and/or code statements to identify a selected buffer and determine if splitting the selected buffer yields a reduced cost. Determining whether buffer splitting yields a reduced cost may include resource-aware splitting, which may include analysis via a buffer resource model and/or a cost model. The buffer resource model may identify if it is advantageous to split the selected buffer into two (or more) buffers. Splitting a buffer with a large depth or large tensor sizes may be particularly beneficial when a buffer is being read in parallel by a consumer (or being written in parallel by a producer) because the tensor may be divided into smaller parallel pieces resulting in a reduction in resource demand.

Splitting (940) the selected buffer to produce a first buffer and a second buffer may include first determining that splitting the selected buffer yields a reduced cost. The selected buffer may be a parallelized buffer, with parallel readers and parallel writers, that are read in parallel by a consumer (or a producer may be read in parallel by the selected buffer). The selected buffer may have a large depth or a large tensor size. The selected buffer may be split into two smaller depth buffers or two smaller tensor sizes, such that the parallel action may be confined to only one of the smaller depth buffers. Buffer splitting may be conducted iteratively on different buffers until no buffers remain that are advantageous to split. One having skill in the art may appreciate that splitting the selected buffer into two (or more) buffers could enable reduced memory unit consumption, reduced latency, and improved run-time performance in a CGR dataflow computing system.

Allocating, placing and routing (950) configurable units may include placing memory units and compute units and routing connections that enable dataflow between the memory units and compute units.

Configuring (960) the configurable units may include configuring the reconfigurable units of the reconfigurable computing grid. In conjunction therewith, configuring (960) the configurable units may include determining the configuration information for configurable units of the reconfigurable computing grid and communicating the configuration information to one or more RDPs 850 (e.g., via the RDP control module 840). Performing (970) the computing task may include initiating dataflow within the reconfigurable computing grid via the RDP control module 840.

FIG. 10 is a set of code statements 1000 of one example of a buffer resource model used within buffer splitting optimization for a CGR dataflow computing system. As depicted, the code statements 1000 comprise split_buffers function 1010, which calls cost function 1020, to determine if it may be advantageous to split the selected buffer within the compute graph and which depth may be most beneficial. Code statements 1000 may be used to determine if it would yield a reduced memory unit consumption cost to split a selected buffer. Code statements 1000 may be used to reduce memory unit consumption, reduce latency, increase throughput, and/or optimize resource utilization.

Split_buffers function 1010 may accept the selected buffer as input. In this example, a parallelization factor 1030 (par_factor) of the selected buffer may be defined by the consumer operation. In other embodiments, the parallelization factor 1030 (par_factor) of the selected buffer may be defined by the producer operation or both producer and consumer operations.

Cost function 1020 analysis may include determining the cost of the physical resources required by the selected buffer, given the selected buffer depth, parallelization factor 1030, and the actual number of bytes within the physical memory units. Split_buffers function 1010 may determine that splitting the selected buffer at a specified depth yields a reduced cost of physical memory units (compared to not splitting the selected buffer). If the buffer resource model yields a reduced cost of splitting, then the selected buffer may be split at the specified depth. Further, it may be advantageous to split the selected buffer into a first buffer and second buffer (or, a parallelized buffer and a non-parallelized buffer, such that the parallelized buffer is smaller than the non-parallelized buffer).

An additional resource cost 1040 may be required when any of the selected buffer, first buffer, or second buffer requires more than one physical memory unit. The depicted "resources" 1040 shows that when "cost>1" then an additional resource cost of "cost+1" indicates that one additional physical memory unit is required to implement a reorder buffer (e.g., in a template implementation). A memory unit corresponding to a reorder buffer may control data reads and writes across another buffer that requires more than one physical memory units. Although the reorder buffer may impose an additional cost of one physical memory unit, minimizing the reorder buffer may not be an explicit motivating factor for the buffer splitting logic (splitting is merely trying to minimize the predicted cost(s)).

Figure 11:
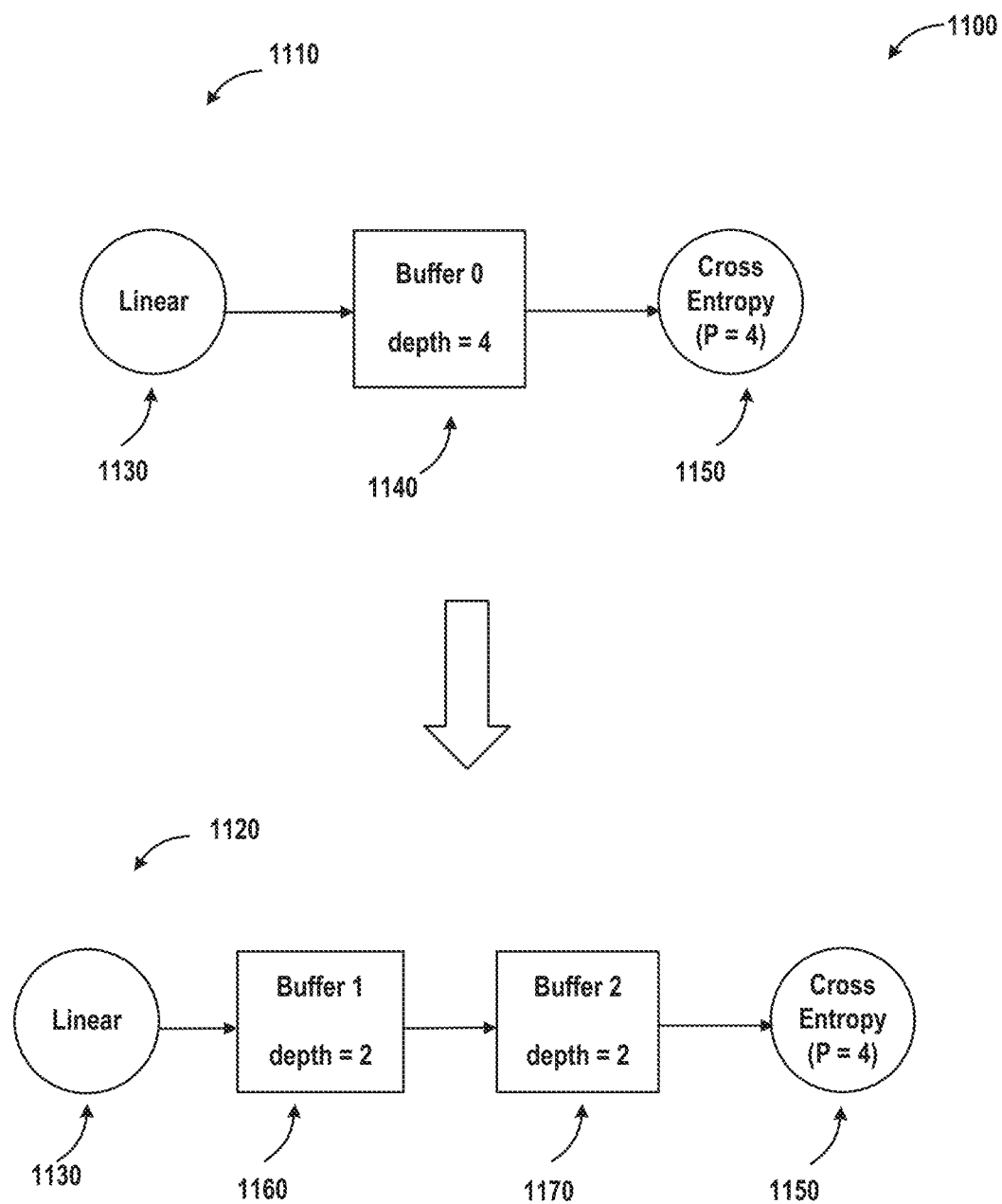
FIG. 11 is a graph diagram of one example of splitting a buffer.

FIG. 11 is a set of before and after compute graphs 1100 of one example of buffer splitting optimization for a CGR dataflow computing system. As depicted, the compute graphs 1100 comprise before compute graph 1110 that is optimized to produce an after compute graph 1120. In some embodiments, the buffer splitting optimization may be conducted iteratively any number of times until no buffers remain that are advantageous to split. One of skill in the art will appreciate that the following described optimizations could be adapted for code statements rather than compute graphs.

Producer operation 1130 may feed data to selected buffer 1140, which may be a parallelized buffer with parallel readers and/or writers. Selected buffer 1140 may provide data to consumer operation 1150. Determining whether splitting selected buffer 1140 yields a reduced cost may include analyzing a buffer resource model. The depicted example shows selected buffer 1140 (depth=4) may be split into first buffer 1160 (depth=2) and second buffer 1170 (depth=2), so that parallel reads and parallel writes may be exclusively isolated to second buffer 1170. First buffer 1160 may broadcast data to parallelized second buffer 1170.

Selected buffer 1140 (depth=4) may require more than one PMU for implementation and, further may require a reorder buffer corresponding to at least one memory unit to control dataflow through the more than one PMUs corresponding to the selected buffer. If selected buffer 1140 (depth=4) is split into two smaller buffers having depth of 2, the first buffer 1160 and the second buffer 1170 may only each require 1 PMU for implementing the corresponding buffer. Consequently, fewer memory units, corresponding to fewer reorder buffers, may be required for compute graph 1120.

In this example, selected buffer 1140 may be split because the buffer resource model analyzes inputs, such as the depth of selected buffer 1140 (depth=4), the dimension of selected buffer 1140, a first parallelization factor (P=1) defined by producer operation 1130, or a second parallelization factor (P=4) defined by consumer operation 1150, and then the buffer resource model yields a reduced cost if selected buffer 1140 is split. Buffer splitting may be conducted iteratively until no buffers remain that are advantageous to split.

Splitting may be accomplished by disconnecting producer operation 1130 (Linear) from selected buffer 1140 (Buffer 0) and then connecting producer operation 1130 (Linear) to first buffer 1160 (Buffer 1). First buffer 1160 (Buffer 1) may connect to and precede second buffer 1170 (Buffer 2). Consumer operation 1150 (CrossEntropy) may be disconnected from selected buffer 1140 (Buffer 0) and then consumer operation 1150 (CrossEntropy) may be connected to second buffer 1170 (Buffer 2). First buffer 1160 (Buffer 1) may be parallelized by a first parallelization factor (P=1), which is defined by producer operation 1130 (Linear). Second buffer 1170 (Buffer 2) may be parallelized by second parallelization factor (P=4), which is defined by consumer operation 1150 (CrossEntropy). One of skill in the art will recognize that producer and consumer operations may be swapped for alternatives (i.e., producer operation 1130 may be a producer buffer, consumer operation 1150 may be a consumer buffer) and that the first and second parallelization factors may have the same value or different values.

Figure 12:
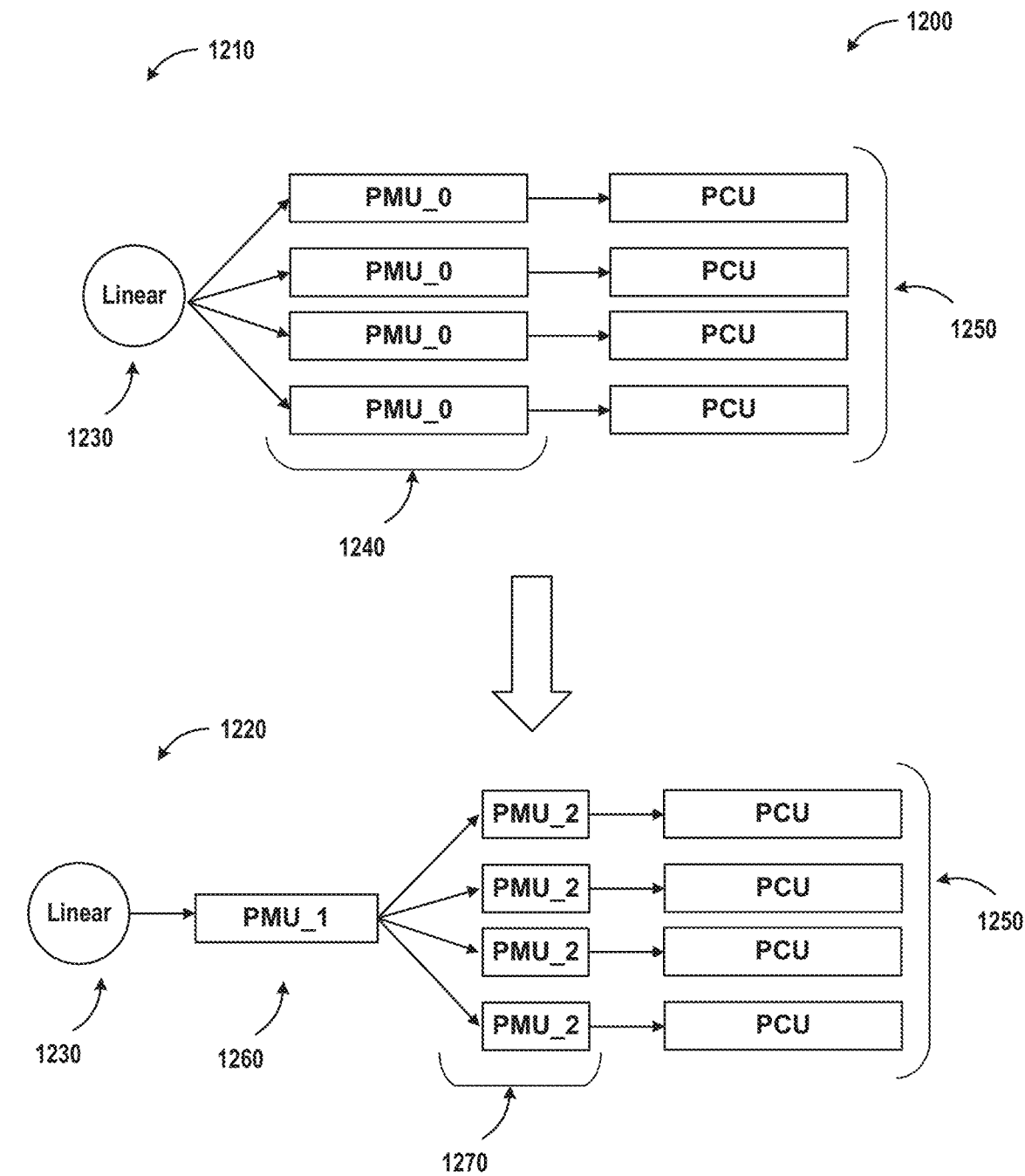
FIG. 12 is a physical representation of one example of splitting a buffer.

FIG. 12 is a set of before and after physical implementations 1200 of one example of buffer splitting optimization for a CGR dataflow computing system. As depicted, the physical implementations 1200 comprise a before physical implementation 1210 that is optimized to produce an after physical implementation 1220. The set of before and after physical implementations 1200 may correspond to the set of before and after compute graphs 1100.

Producer operation 1230 may feed data to selected buffer PMUs 1240, which may be parallelized PMUs having parallel readers and/or writers. Selected buffer PMUs 1240 may have data read in parallel by consumer operation PCUs 1250. Determining whether splitting selected buffer PMUs 1240 yields a reduced cost may include analyzing a buffer resource model. The depicted example shows selected buffer PMUs 1240 may be split into first buffer PMU 1260 and second buffer PMUs 1270, so that parallel reads and parallel writes may be exclusively isolated to second buffer PMUs 1270. First buffer PMU 1260 may broadcast data to parallelized second buffer PMUs 1270. Buffer splitting may be conducted iteratively until no buffers remain that are advantageous to split.

Splitting may be accomplished by disconnecting producer operation 1230 (Linear) from selected buffer PMUs 1240 (PMU_0) and then connecting producer operation 1230 (Linear) to first buffer PMUs 1260 (PMU_1). First buffer PMU 1260 (PMU_1) may broadcast to second buffer PMUs 1270 (PMU_2). Consumer operation PCUs 1250 (PCU) may be disconnected from selected buffer PMUs 1240 (PMU_0) and then consumer operation PCUs 1250 (PCU) may be connected to second buffer PMUs 1270 (PMU_2). First buffer PMUs 1260 (PMU_1) may be parallelized by a first parallelization factor (P=1), which is defined by producer operation 1230 (Linear). Second buffer PMUs 1270 (PMU_2) may be parallelized by second parallelization factor (P=4), which is defined by consumer operation PCUs 1250 (PCU).

The buffer splitting optimization may reduce memory unit consumption, reduce latency, and improve runtime performance. One having skill in the art will appreciate that values for the first and second parallelization factors may be exchanged. Specifically, the first parallelization factor may be greater than one, as defined by a parallel producer operation, and the second parallelization factor may be equal to one, as defined by a non-parallel consumer operation.

Figure 13:
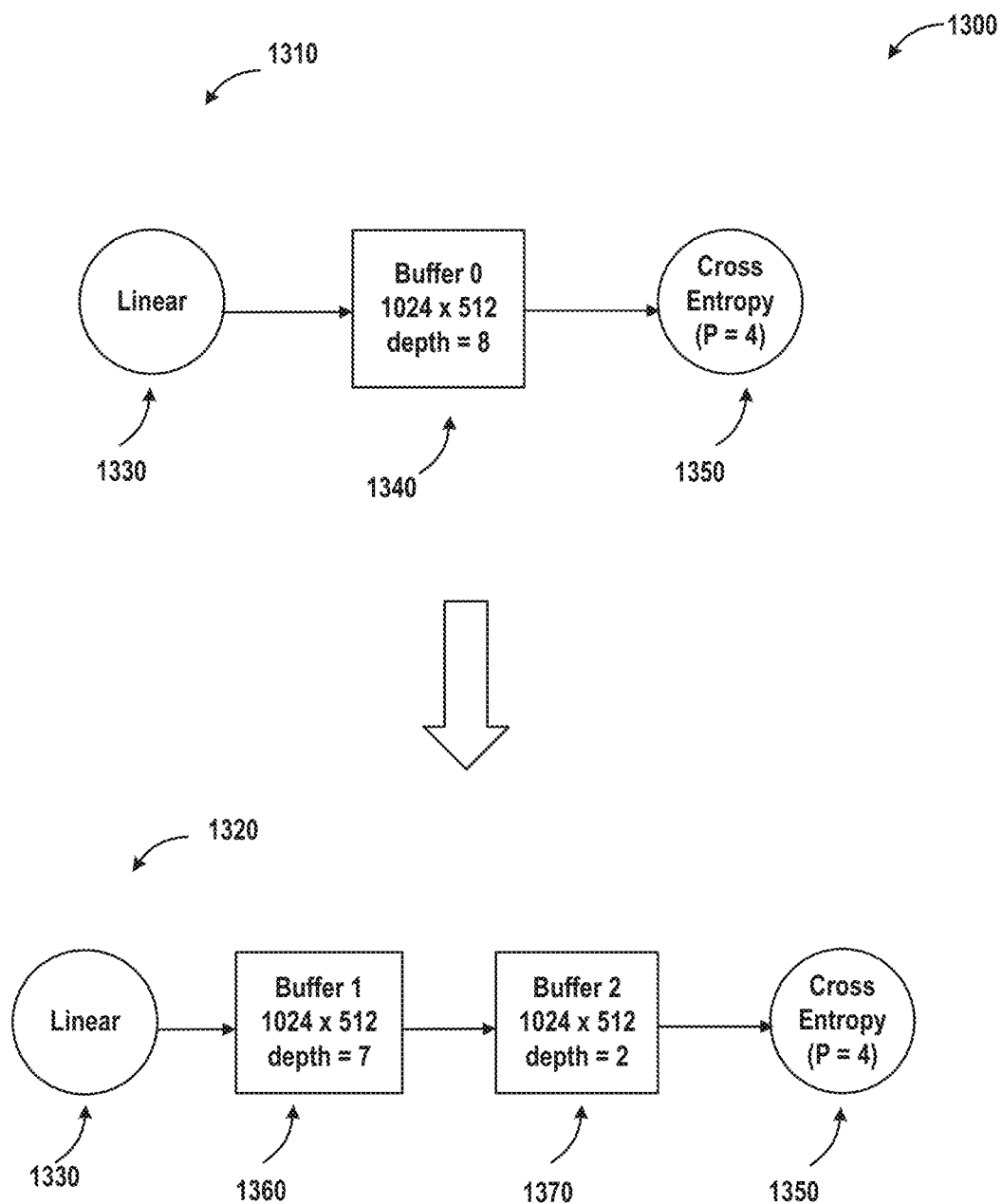
FIG. 13 is a graph diagram of one example of splitting a buffer.

FIG. 13 is a set of before and after compute graphs 1300 of one example of buffer splitting optimization for a CGR dataflow computing system. As depicted, the compute graphs 1300 comprise before compute graph 1310 that is optimized to produce an after compute graph 1320. In some embodiments, the buffer splitting optimization may be conducted iteratively any number of times until no buffers remain that are advantageous to split. One of skill in the art will appreciate that the following described optimizations could be adapted for a code statements rather than compute graphs.

A producer operation 1330 may feed data to a selected buffer 1340, which may be a parallelized buffer with parallel readers and/or writers. The selected buffer 1340 may provide data to a consumer operation 1350. Determining whether splitting the selected buffer 1340 yields a reduced cost may include analyzing a buffer resource model. The depicted example shows selected buffer 1340 (depth=8, dimension=1024×512) may be split into a first buffer 1360 (depth=7, dimension=1024×512) and second buffer 1370 (depth=2, dimension=1024×512), so that parallel reads and parallel writes may be exclusively isolated to second buffer 1370. First buffer 1360 may broadcast data to parallelized second buffer 1370. In terms of pipeline scheduling, the first buffer 1360 (depth=7) and the second buffer 1370 (depth=2) may retain the same number of pipelining stages as selected buffer 1340 (depth=8) because the read of the first buffer 1360 and the write of the second buffer 1370 are within a single stage.

In this example, selected buffer 1340 may be split because the buffer resource model analyzes inputs, such as the depth of selected buffer 1340 (depth=8), the dimension/channel shape of selected buffer 1340, a first parallelization factor (P=1) defined by producer operation 1330, or a second parallelization factor (P=4) defined by consumer operation 1350, and the buffer resource model yields a reduced cost if selected buffer 1340 is split.

Splitting may be accomplished by disconnecting producer operation 1330 (Linear) from selected buffer 1340 (Buffer 0) and then connecting producer operation 1330 (Linear) to first buffer 1360 (Buffer 1). First buffer 1360 (Buffer 1) may connect to and precede second buffer 1370 (Buffer 2). Consumer operation 1350 (CrossEntropy) may be disconnected from selected buffer 1340 (Buffer 0) and then consumer operation 1350 (CrossEntropy) may be connected to second buffer 1370 (Buffer 2). First buffer 1360 (Buffer 1) may be parallelized by a first parallelization factor (P=1), which is defined by producer operation 1330 (Linear). Second buffer 1370 (Buffer 2) may be parallelized by second parallelization factor (P=4), which is defined by consumer operation 1350 (CrossEntropy). One of skill in the art will recognize that producer and consumer operations may be swapped for alternatives (i.e., producer operation 1330 may be a producer buffer, consumer operation 1350 may be a consumer buffer) and that the first and second parallelization factors may have the same value or different values.

Figure 14:
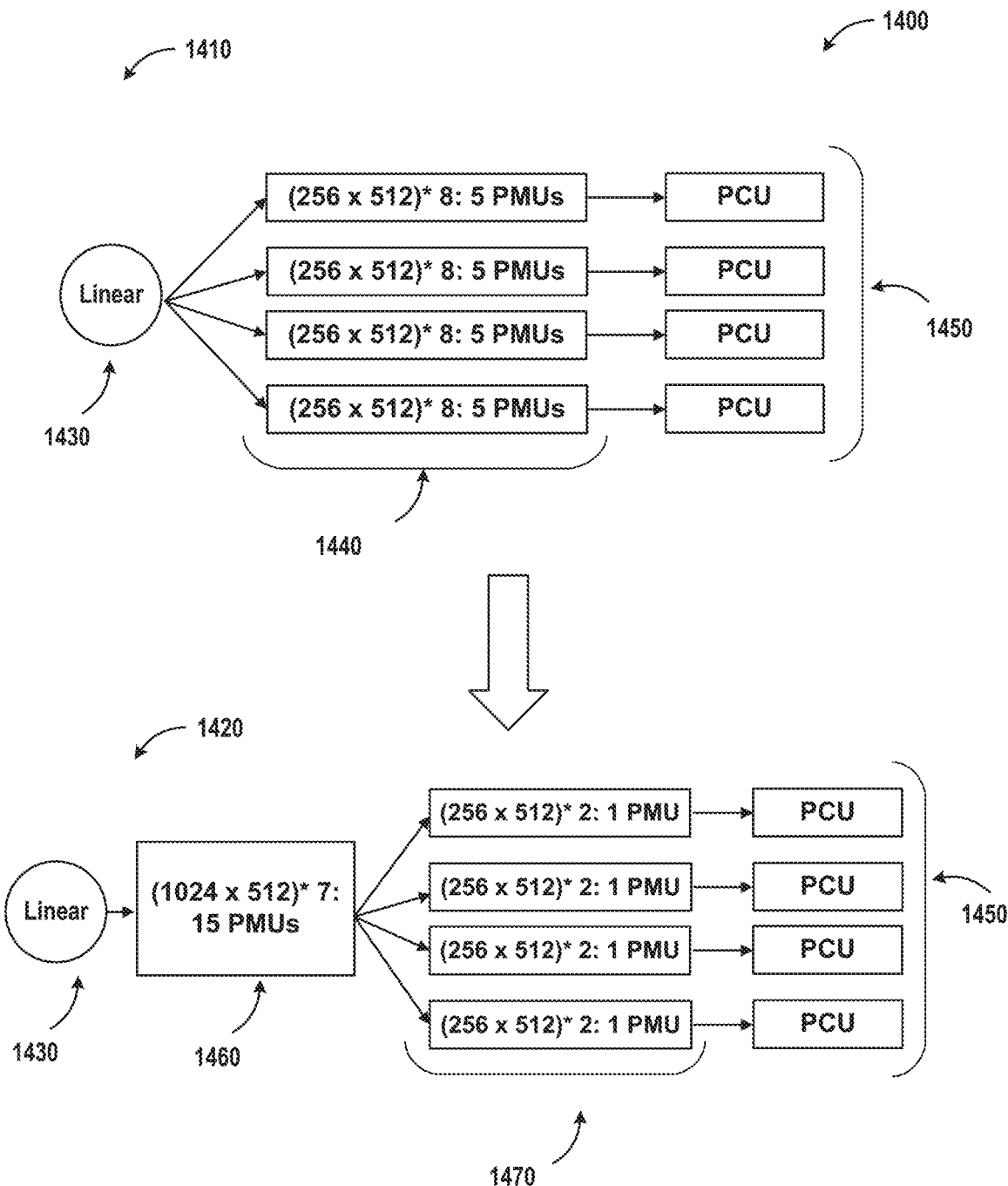
FIG. 14 is a physical representation of one example of splitting a buffer.

FIG. 14 is a set of before and after physical implementations 1400 of one example of buffer splitting optimization for a CGR dataflow computing system. As depicted, the physical implementations 1400 comprise a before physical implementation 1410 that is optimized to produce an after physical implementation 1420. The set of before and after physical implementations 1400 may correspond to the set of before and after compute graphs 1300.

Producer operation 1430 may feed data to selected buffer PMUs 1440, which may be parallelized PMUs having parallel readers and/or writers. Selected buffer PMUs 1440 may have data read in parallel by consumer operation PCUs 1450. Determining whether splitting the selected buffer PMUs 1440 yields a reduced cost may include analyzing a buffer resource model. The depicted example shows selected buffer PMUs 1440 may be split into first buffer PMUs 1460 and second buffer PMUs 1470, so that parallel reads and parallel writes may be exclusively isolated to second buffer PMUs 1470. First buffer PMUs 1460 may broadcast data to parallelized second buffer PMUs 1470. Buffer splitting may be conducted iteratively until no buffers remain that are advantageous to split.

Selected buffer PMUs 1440 may be parallelized into 4 parallel channels, each channel having dimension 256×512 and depth 8, so that each channel may fit within 4 PMUs. However, a reorder buffer is required for each channel because each channel requires more than one physical memory unit or PMU. The reorder buffer may be required to control data reads/writes across a channel's 4 PMUs. An extra cost of 1 PMU may be required for a reorder buffer in each channel, so the cost for each of the 4 channels may be 5 PMUs and the total resources cost of the selected buffer PMUs 1440 is 20 PMUs.

Buffer splitting may generate a larger first buffer PMUs 1460 and a smaller second buffer PMUs 1470. First buffer PMUs 1460, with dimension 1024×512 and depth of 7, may no longer be parallelized. The number of physical memory units required by first buffer PMUs 1460 may be calculated as 14 PMUs, plus 1 PMU for a reorder buffer when more than one physical memory unit is used. First buffer PMUs 1460 may broadcast to parallelized second buffer PMUs 1470, with each of the 4 parallelized channels having dimension 256×512 and depth 2. Each of the 4 parallelized channels may use 1 PMU, so no additional resource cost of a reorder buffer may be required for each channel.

The total cost after buffer splitting is 15 PMUs plus 4 PMUs for the smaller parallelized second buffer PMUs 1470, which generates a total cost of 19 PMUs. Comparing the physical resource cost of 19 PMUs after buffer splitting optimization to the original physical resource cost of 20 PMUs, a savings of 1 PMU is achieved by amortizing the cost of the additional reorder buffer with the original selected buffer PMUs 1440. In this embodiment, the buffer splitting logic does not explicitly search for reorder buffers, but merely analyzes ways to reduce resource utilization costs. In other embodiments, the buffer splitting logic may explicitly search for reorder buffers as a way to reduce resource utilization costs.

Splitting may be accomplished by disconnecting producer operation 1430 (Linear) from selected buffer PMUs 1440 and then connecting producer operation 1430 (Linear) to first buffer PMUs 1460. First buffer PMU 1460 may broadcast to second buffer PMUs 1470. Consumer operation PCUs 1450 may be disconnected from selected buffer PMUs 1440 and then consumer operation PCUs 1450 may be connected to second buffer PMUs 1470. First buffer PMUs 1460 may be parallelized by a first parallelization factor (P=1), which is defined by producer operation 1430 (Linear). Second buffer PMUs 1470 may be parallelized by second parallelization factor (P=4), which is defined by consumer operation PCUs 1450. Splitting may reduce memory unit consumption, reduce latency, and/or improve runtime performance.

The examples disclosed herein include a system in a reconfigurable computing system, the system comprising:
  a host computer comprising an optimization module configured to conduct a method comprising:
    receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions
    converting the plurality of tensor-based algebraic expressions to an intermediate representation comprising one or more logical operations, executable via dataflow through one or more compute units of the grid of compute units, one or more logical operations preceded by or followed by a buffer, each buffer corresponding to one or more memory units within the grid of memory units
    determining whether splitting a selected buffer yields a reduced cost
    splitting the selected buffer in response to determining that splitting the selected buffer yields the reduced cost, to produce a first buffer and a second buffer
    wherein dataflow through memory units corresponding to the first buffer and the second buffer is controlled by one or more memory units of the grid of memory units
  Optional features for the above system include:
  wherein the reduced cost comprises a reduced memory unit consumption
  wherein the reduced cost comprises a reduced place and route complexity
  wherein the selected buffer is a large-depth buffer
    wherein the large-depth buffer is split into two or more smaller-depth buffers to produce the first buffer and the second buffer
  wherein the selected buffer has a first parallelization factor, defined by a preceding writer, and a second parallelization factor, defined by a subsequent reader, and the first buffer precedes the second buffer
    wherein the first buffer is parallelized by the first parallelization factor
      wherein a preceding writer to the selected buffer is disconnected from the selected buffer and then connected to the first buffer to form a preceding writer to the first buffer, and the second buffer reads from the first buffer
    wherein the second buffer is parallelized by the second parallelization factor
      wherein a subsequent reader of the selected buffer is disconnected from the selected buffer and then connected to the second buffer to form a subsequent reader of the second buffer, and the first buffer writes to the second buffer
  wherein determining whether splitting the buffer yields a reduced cost comprises using a buffer resource model and a cost model
  wherein buffer splitting is iteratively conducted until no buffers remain that are advantageous to split.

The embodiments disclosed herein include a method in a reconfigurable computing system, the method comprising:
  receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions
  converting the plurality of tensor-based algebraic expressions to an intermediate representation comprising one or more logical operations, executable via dataflow through one or more compute units of the grid of compute units, one or more logical operations preceded by or followed by a buffer, each buffer corresponding to one or more memory units within the grid of memory units
  determining whether splitting a selected buffer yields a reduced cost
  splitting the selected buffer in response to determining that splitting the selected buffer yields the reduced cost, to produce a first buffer and a second buffer
  wherein dataflow through memory units corresponding to the first buffer and the second buffer is controlled by one or more memory units of the grid of memory units
Optional features for the above method include:
wherein the reduced cost comprises a reduced memory unit consumption
wherein the reduced cost comprises a reduced place and route complexity
wherein the selected buffer is a large-depth buffer
  wherein the large-depth buffer is split into two or more smaller-depth buffers to produce the first buffer and the second buffer
wherein the selected buffer has a first parallelization factor, defined by a preceding writer, and a second parallelization factor, defined by a subsequent reader, and the first buffer precedes the second buffer
  wherein the first buffer is parallelized by the first parallelization factor
    wherein a preceding writer to the selected buffer is disconnected from the selected buffer and then connected to the first buffer to form a preceding writer to the first buffer, and the second buffer reads from the first buffer
  wherein the second buffer is parallelized by the second parallelization factor
    wherein a subsequent reader of the selected buffer is disconnected from the selected buffer and then connected to the second buffer to form a subsequent reader of the second buffer, and the first buffer writes to the second buffer wherein determining whether splitting the buffer yields a reduced cost comprises using a buffer resource model and a cost model wherein buffer splitting is iteratively conducted until no buffers remain that are advantageous to split.

As will be appreciated by those of ordinary skill in the art, aspects of the various embodiments described herein may be embodied as a system, device, method, process, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage mediums may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method or process. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

What is claimed is:

1. A system in reconfigurable dataflow processors, the system comprising:

a host computer comprising an optimization module configured to conduct a method comprising:

receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;

converting the plurality of tensor-based algebraic expressions to an intermediate representation comprising one or more logical operations, executable via dataflow through one or more compute units of the grid of compute units, one or more logical operations preceded by or followed by a buffer, each buffer corresponding to one or more memory units within the grid of memory units;

determining whether splitting a selected buffer yields a reduced cost;

splitting the selected buffer in response to determining that splitting the selected buffer yields the reduced cost, to produce a first buffer and a second buffer; and wherein dataflow through memory units corresponding to the first buffer and the second buffer is controlled by one or more memory units of the grid of memory units.

2. The system of claim 1, wherein the reduced cost comprises a reduced memory unit consumption.

3. The system of claim 1, wherein buffer splitting is iteratively conducted until no buffers remain that are advantageous to split.

4. The system of claim 1, wherein the selected buffer has a first parallelization factor, defined by a preceding writer, and a second parallelization factor, defined by a subsequent reader, and the first buffer precedes the second buffer.

5. The system of claim 4, wherein the first buffer is parallelized by the first parallelization factor.

6. The system of claim 5, wherein a preceding writer to the selected buffer is disconnected from the selected buffer and then connected to the first buffer to form a preceding writer to the first buffer, and the second buffer reads from the first buffer.

7. The system of claim 4, wherein the second buffer is parallelized by the second parallelization factor.

8. The system of claim 7, wherein a subsequent reader of the selected buffer is disconnected from the selected buffer and then connected to the second buffer to form a subsequent reader of the second buffer, and the first buffer writes to the second buffer.

9. The system of claim 1, wherein determining whether splitting the buffer yields a reduced cost comprises using a buffer resource model and a cost model.

10. A method in a reconfigurable computing system, the method comprising:
- receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;
- converting the plurality of tensor-based algebraic expressions to an intermediate representation comprising one or more logical operations, executable via dataflow through one or more compute units of the grid of compute units, one or more logical operations preceded by or followed by a buffer, each buffer corresponding to one or more memory units within the grid of memory units;
- determining whether splitting a selected buffer yields a reduced cost;
- splitting the selected buffer in response to determining that splitting the selected buffer yields the reduced cost, to produce a first buffer and a second buffer; and
- wherein dataflow through memory units corresponding to the first buffer and the second buffer is controlled by one or more memory units of the grid of memory units.

11. The method of claim 10, wherein the reduced cost comprises a reduced memory unit consumption.

12. The method of claim 10, wherein buffer splitting is iteratively conducted until no buffers remain that are advantageous to split.

13. The method of claim 10, wherein the selected buffer has a first parallelization factor, defined by a preceding writer, and a second parallelization factor, defined by a subsequent reader, and the first buffer precedes the second buffer.

14. The method of claim 13, wherein the first buffer is parallelized by the first parallelization factor.

15. The method of claim 14, wherein a preceding writer to the selected buffer is disconnected from the selected buffer and then connected to the first buffer to form a preceding writer to the first buffer, and the second buffer reads from the first buffer.

16. The method of claim 13, wherein the second buffer is parallelized by the second parallelization factor.

17. The method of claim 16, wherein a subsequent reader of the selected buffer is disconnected from the selected buffer and then connected to the second buffer to form a subsequent reader of the second buffer, and the first buffer writes to the second buffer.

18. The method of claim 10, wherein determining whether splitting the buffer yields a reduced cost comprises using a buffer resource model and a cost model.

19. A computer program product comprising a computer readable storage medium having program instructions embodied therewith, wherein the computer readable storage medium is not a transitory signal per se, wherein the program instructions are executable by a processor to cause the processor to conduct a method comprising:
- receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;
- converting the plurality of tensor-based algebraic expressions to an intermediate representation comprising one or more logical operations, executable via dataflow through one or more compute units of the grid of compute units, one or more logical operations preceded by or followed by a buffer, each buffer corresponding to one or more memory units within the grid of memory units;
- determining whether splitting a selected buffer yields a reduced cost;
- splitting the selected buffer in response to determining that splitting the selected buffer yields the reduced cost, to produce a first buffer and a second buffer; and
- wherein dataflow through memory units corresponding to the first buffer and the second buffer is controlled by one or more memory units of the grid of memory units.

* * * * *